United States Patent
Dattagupta et al.

(10) Patent No.: US 8,868,694 B2
(45) Date of Patent: Oct. 21, 2014

(54) CONFIGURING MULTIPLE NETWORK DEVICES IN A SETUP FLOW

(75) Inventors: Siddhartha Dattagupta, Irvine, CA (US); Aaron Hyman Averbuch, Seattle, WA (US); Mike Mouawad, Laguna Hills, CA (US); Aidan Nicholas Low, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 13/156,196

(22) Filed: Jun. 8, 2011

(65) Prior Publication Data

US 2012/0317247 A1    Dec. 13, 2012

(51) Int. Cl.
G06F 15/177 (2006.01)
G06F 15/16 (2006.01)
H04W 84/00 (2009.01)
H04L 12/28 (2006.01)

(52) U.S. Cl.
CPC .......... *H04L 12/2807* (2013.01); *H04W 84/00* (2013.01)
USPC ........................................ 709/220; 709/219

(58) Field of Classification Search
CPC ................................................... H04W 84/00
USPC ........................................................ 709/220
See application file for complete search history.

(56) References Cited

U.S. PATENT DOCUMENTS

| | | | |
|---|---|---|---|
| 7,376,717 B2 * | 5/2008 | Bhogal et al. | 709/220 |
| 8,489,715 B2 * | 7/2013 | Averbuch et al. | 709/220 |
| 8,650,311 B2 * | 2/2014 | Dattagupta et al. | 709/228 |
| 2003/0097438 A1 * | 5/2003 | Bearden et al. | 709/224 |
| 2005/0259598 A1 * | 11/2005 | Griffin et al. | 370/255 |
| 2007/0249366 A1 * | 10/2007 | Thomson et al. | 455/456.1 |
| 2011/0261792 A1 * | 10/2011 | Oerton et al. | 370/335 |
| 2012/0083291 A1 * | 4/2012 | Thomson et al. | 455/456.2 |
| 2013/0121321 A1 * | 5/2013 | Backes | 370/338 |

* cited by examiner

*Primary Examiner* — Gerald Smarth
(74) *Attorney, Agent, or Firm* — Patterson + Sheridan, LLP

(57) ABSTRACT

A smart network may include a smart network host device as well as a smart network connector device, a smart network extender device and one or more client devices configured to connect to the smart network. An installation module is configured to connect to the smart network host device to determine whether a user is attempting to setup multiple network devices substantially simultaneously. The installation module then configures the multiple network devices based on the other network devices connected to the smart network host device. The installation module simplifies setup of the smart network by combining the configuration of multiple network devices into a single setup flow.

20 Claims, 13 Drawing Sheets

CONFIGURING MULTIPLE NETWORK DEVICES IN A SETUP FLOW

BACKGROUND

1. Technical Field

The present disclosure relates generally to wireless networks and, more specifically, to configuring multiple network devices in a setup flow.

2. Description of the Related Art

Home networks, in which multiple computing and/or peripheral devices are communicatively linked together in a consumer's home, are becoming increasingly ubiquitous. A home environment may include one or more computers, a wireless router, a dsl modem, and one or more other devices capable of connecting to the home network. Conventionally, each device in the home network must be individually configured to connect to the network and, once configured, may then communicate with each of the other devices attached to the home network.

In practice, however, procedures for establishing and provisioning services on a home network are typically too involved for the majority of home network users to implement reliably. For example, a network user may need to manually reconfigure the home network router, determine a network IP address and/or hostname for each device, establish network credentials, register the various services for each device, etc. Furthermore, in order for a device to locate another device on the home network, a device must establish communication using a unique IP address of the other device. Such connections are typically defined as peer-to-peer connections. A user may be required to manually keep track of which address is associated with which device or service in order to configure the devices to communicate on the home network. The manual configuration procedures described above make it a challenge for unsophisticated users to reliably setup a home network and provision services on the home network.

Accordingly, there is a need in the art for systems and methods that reliably and conveniently enable the user of a home network to automatically configure and provision multiple devices on the home network.

BRIEF DESCRIPTION OF THE DRAWINGS

So that the manner in which the features of the present disclosure can be understood in detail, a more particular description may be had by reference to example embodiments, some of which are illustrated in the appended drawings. It is to be noted, however, that the appended drawings illustrate only example embodiments and are therefore not to be considered limiting of its scope, for the disclosure may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

Figure 1A:
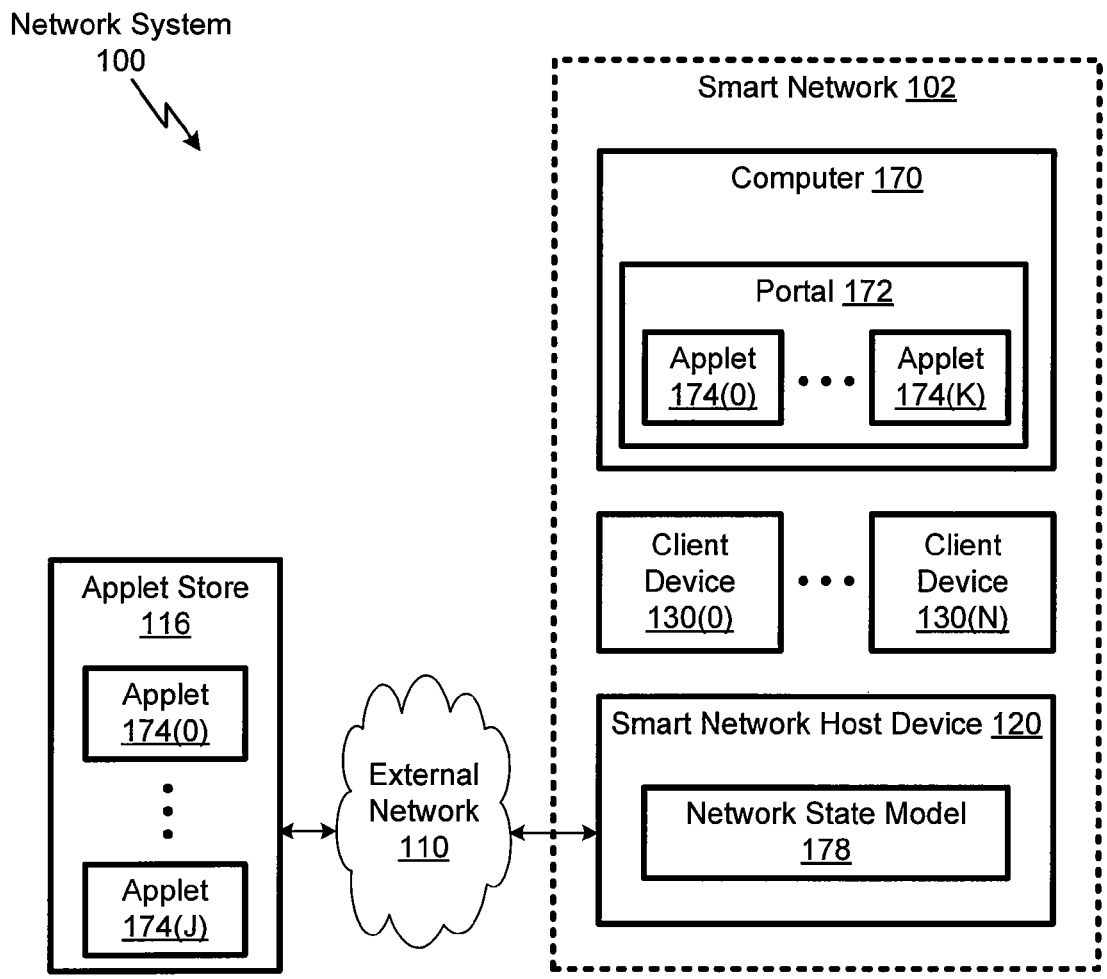
FIG. 1A is an exemplary illustration of an overarching network system configured to implement one or more aspects of the present invention.

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One example embodiment of the present invention sets forth a method comprising the steps of establishing a connection with a network host device that is configured to provide a wireless access point to one or more client devices for connecting to a wireless home network, determining whether the network host device is connected to a network connector device that is configured to provide access to a wide area network (WAN), and if the network host device is connected to the network connector device, then causing the network connector device to configure as a router device, and causing the network host device to configure as a bridge device, or if the network host device is not connected to the network connector device, then causing the network host device to configure as a router device.

Another example embodiment of the present invention sets forth a computer-readable medium including instructions that, when executed by a processing unit, cause the processing unit to perform the steps of establishing a connection with a network host device that is configured to provide a wireless access point to one or more client devices for connecting to a wireless home network, determining whether the network host device is connected to a network connector device that is configured to provide access to a wide area network (WAN), and if the network host device is connected to the network connector device, then causing the network connector device to configure as a router device, and causing the network host device to configure as a bridge device, or if the network host device is not connected to the network connector device, then causing the network host device to configure as a router device.

Yet another example embodiment of the present invention sets forth a system comprising a network host device that is configured to provide a wireless access point to one or more client devices for connecting to a wireless home network and an installation module. The installation module is configured to establish a connection with the network host device, determine whether the network host device is connected to a network connector device that is configured to provide access to a wide area network (WAN), and if the network host device is connected to the network connector device, then cause the network connector device to configure as a router device, and cause the network host device to configure as a bridge device, or if the network host device is not connected to the network connector device, then cause the network host device to configure as a router device.

DETAILED DESCRIPTION OF THE FIGURES

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
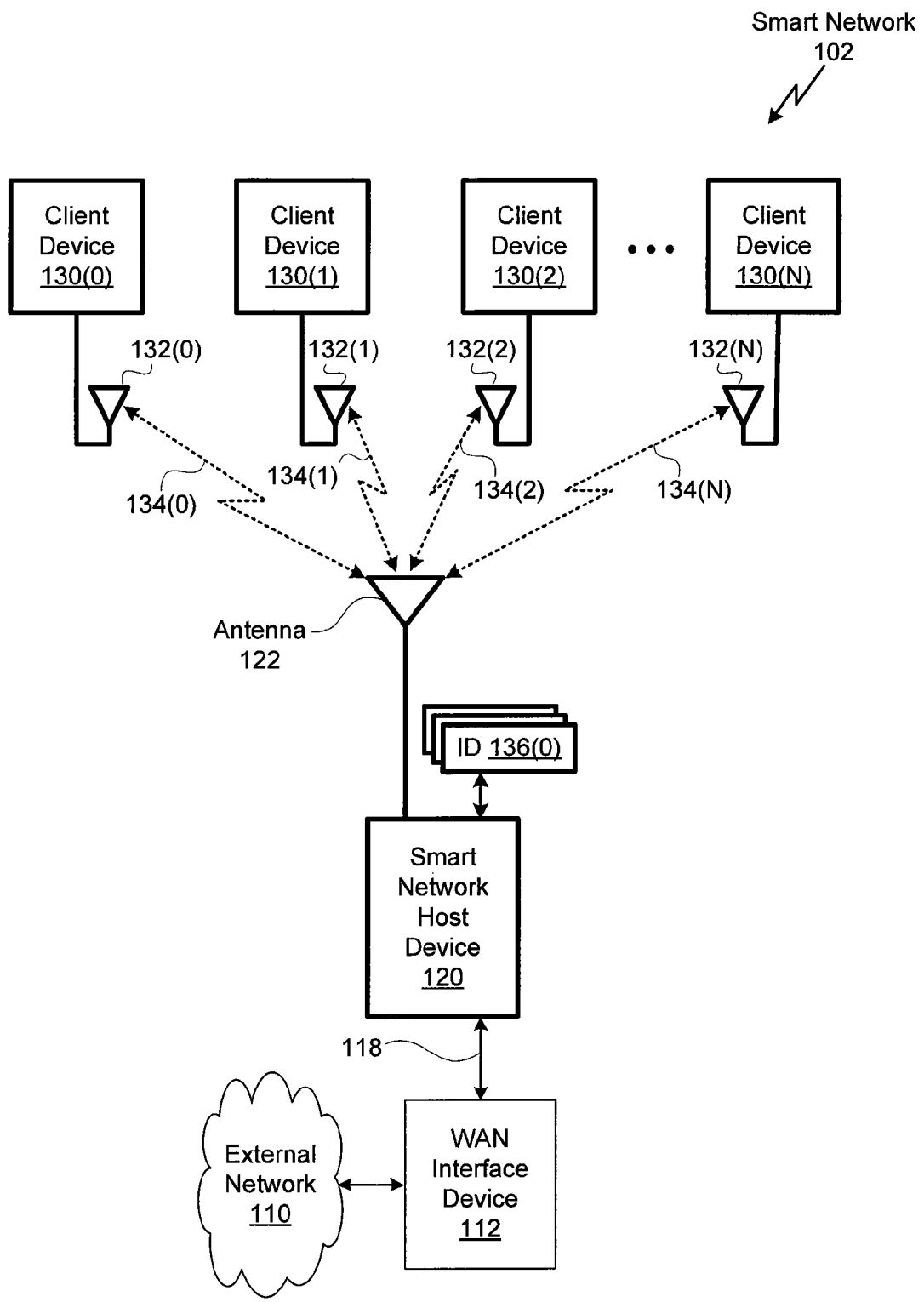
FIG. 1B illustrates the smart home network of FIG. 1A, according to one example embodiment of the present invention.

FIG. 1B illustrates the smart home network 102 of FIG. 1A, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements layer 2 forwarding (bridging) for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present disclosure. For example, in another embodiment, the ID devices 136 could be implemented as a physical token that includes a printed bar code on a face of the token. The bar code may encode authentication credentials for a corresponding client device 130. In such an embodiment, the smart network host device 120 may include an optical scanner capable of reading the printed bar code from the physical token. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative embodiments, a user may manually authenticate a client device 130 with the smart network host device 120. For example, the user may log onto a management web page generated by the smart network host device 120 and manually enter authentication credentials, such as a printed code associated with the client device 130. In yet other embodiments, the smart network host device 120 and one or more client devices 130 may implement the Wi-Fi Protected Setup (WPS) protocol for establishing and securing the smart network 102.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
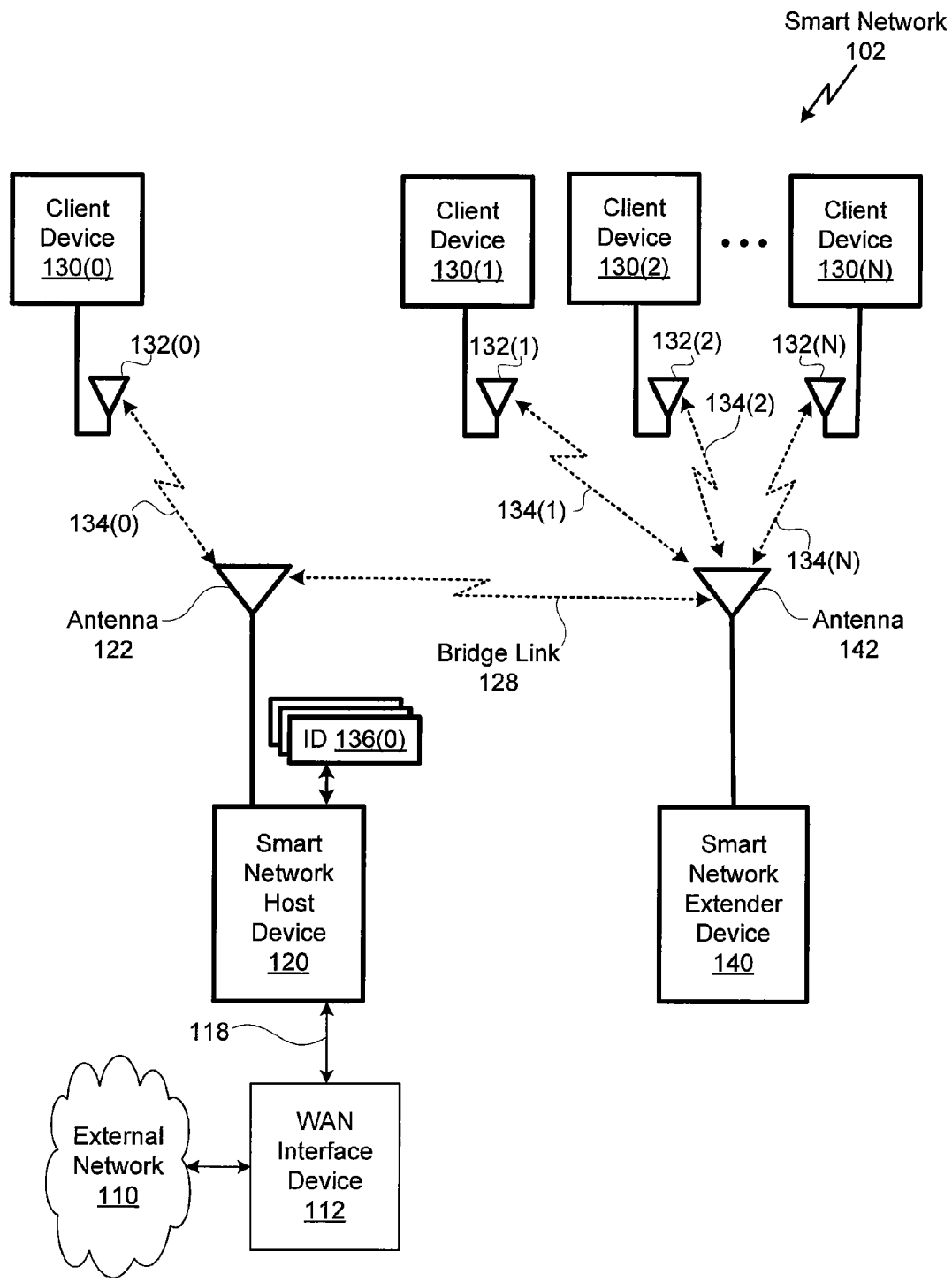
FIG. 1C illustrates the smart home network of FIG. 1A, according to another example embodiment of the present invention.

FIG. 1C illustrates the smart home network 102 of FIG. 1A, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
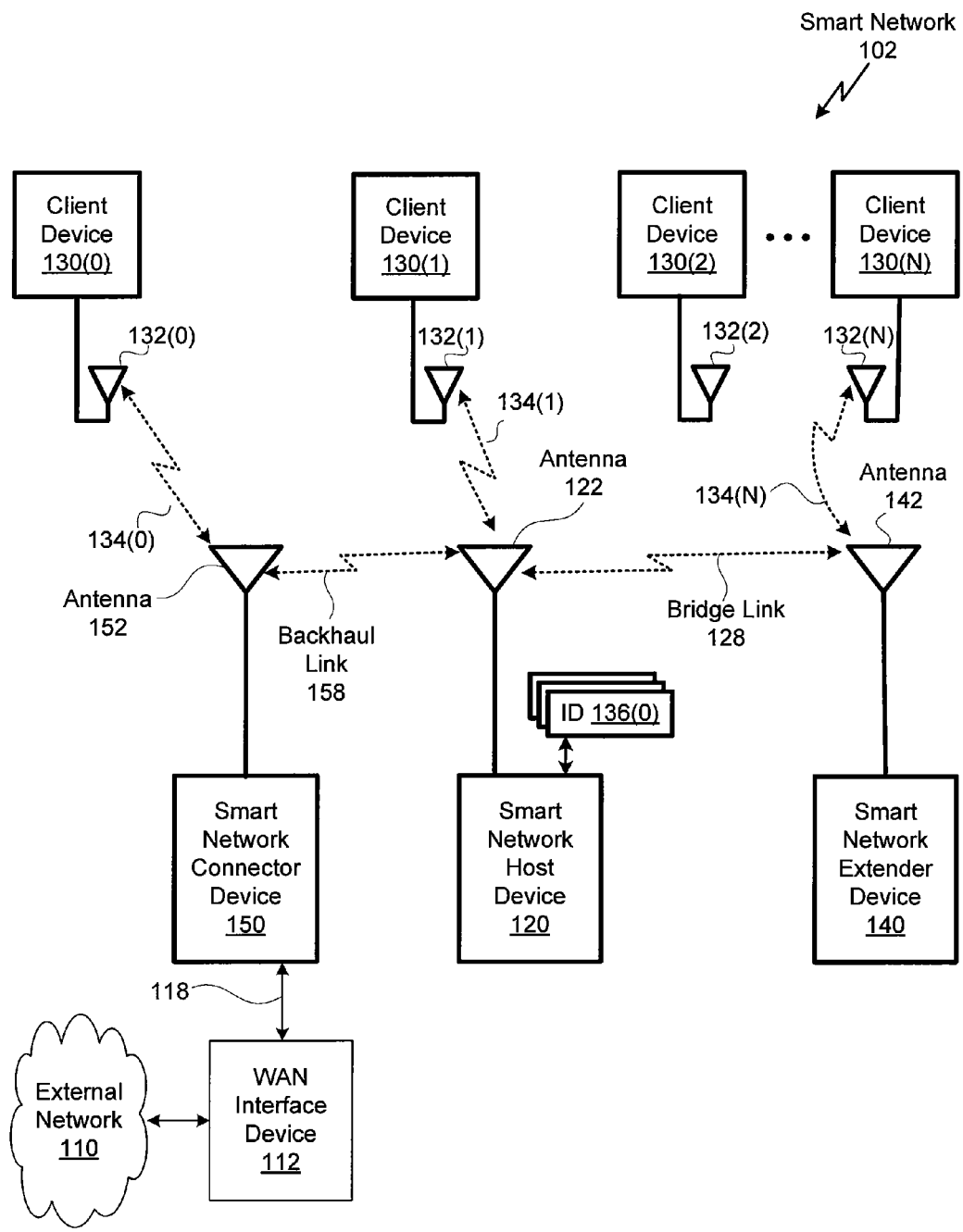
FIG. 1D illustrates the smart home network of FIG. 1A, according to yet another example embodiment of the present invention.

FIG. 1D illustrates the smart home network 102 of FIG. 1A, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150. In one embodiment, the backhaul link 158 is associated with minimum Quality of Service (QoS) requirements, such as a minimum amount of bandwidth on a particular radio frequency band.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
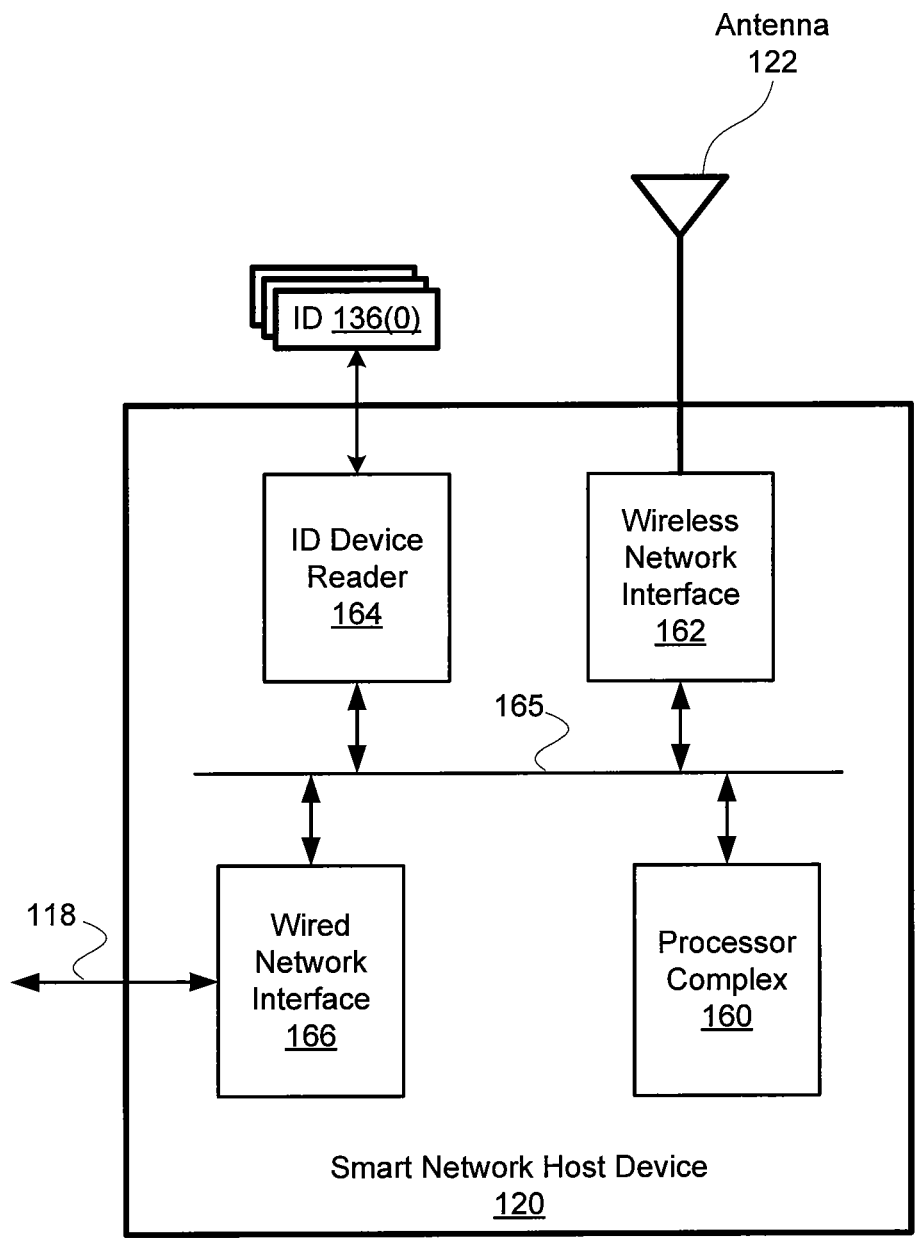
FIG. 1E is a more detailed illustration of the smart network host device of FIG. 1A, according to one example embodiment of the present invention.

FIG. 1E is a more detailed illustration of the smart network host device 120 of FIG. 1A, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In another embodiment, the ID device reader 164 may be implemented as an optical scanner for reading ID devices 136 that encode data via a printed bar code. In yet other embodiments, the ID device reader 164 may be configured to read data from other types of interfaces, such as other types of flash memories like an SD flash card.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
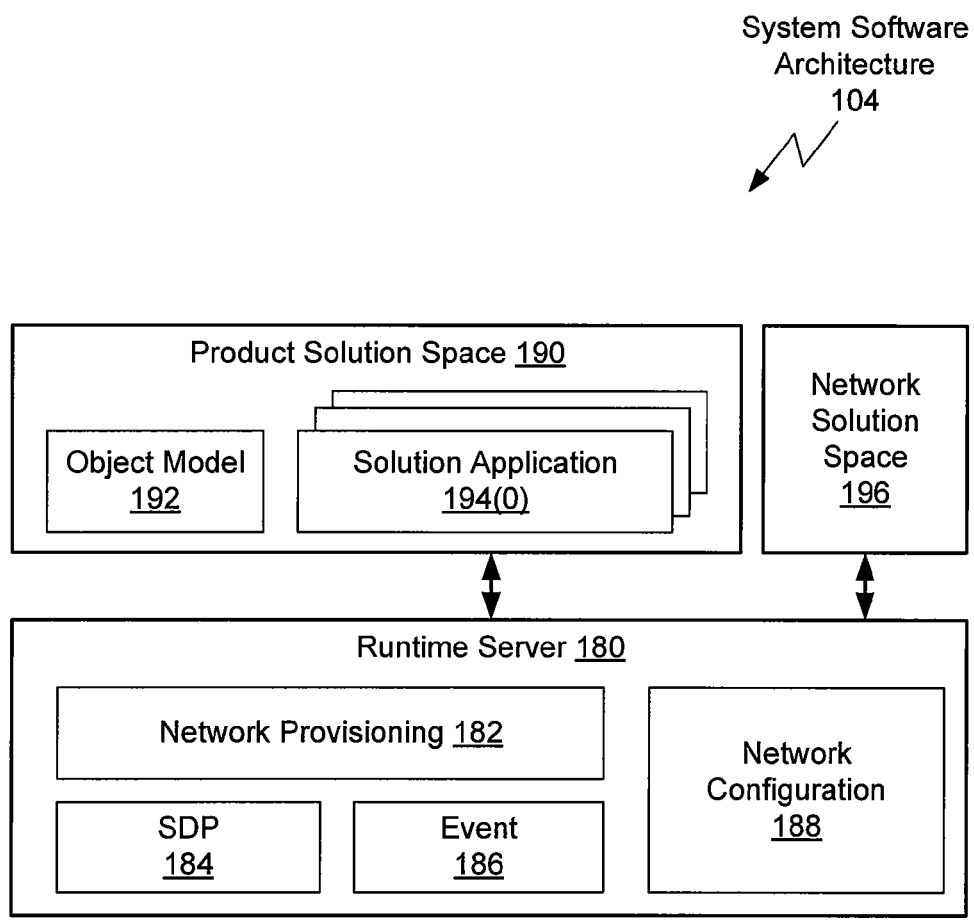
FIG. 1F illustrates a system software architecture for the smart network host device of FIG. 1E, according to one example embodiment of the present invention.

FIG. 1F illustrates a system software architecture for the smart network host device of FIG. 1E, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

A user may want to setup a smart network 102 in his or her home and may purchase one or more network devices in order to configure the smart network 102 of FIG. 1B, 1C or 1D. For example a user may purchase a smart network host device 120 to create the smart network 102 of FIG. 1B. Alternatively, a user may purchase a combination of both a smart network host device 120 and a smart network extender device 140 to create the smart network 102 of FIG. 1C. Furthermore, a user may purchase a smart network connector device 150 in combination with the smart network host device 120 and the smart network extender device 140 to create the smart network 102 of FIG. 1D. Typically, a user will purchase and attempt to configure these devices at substantially the same time.

Figure 2A:
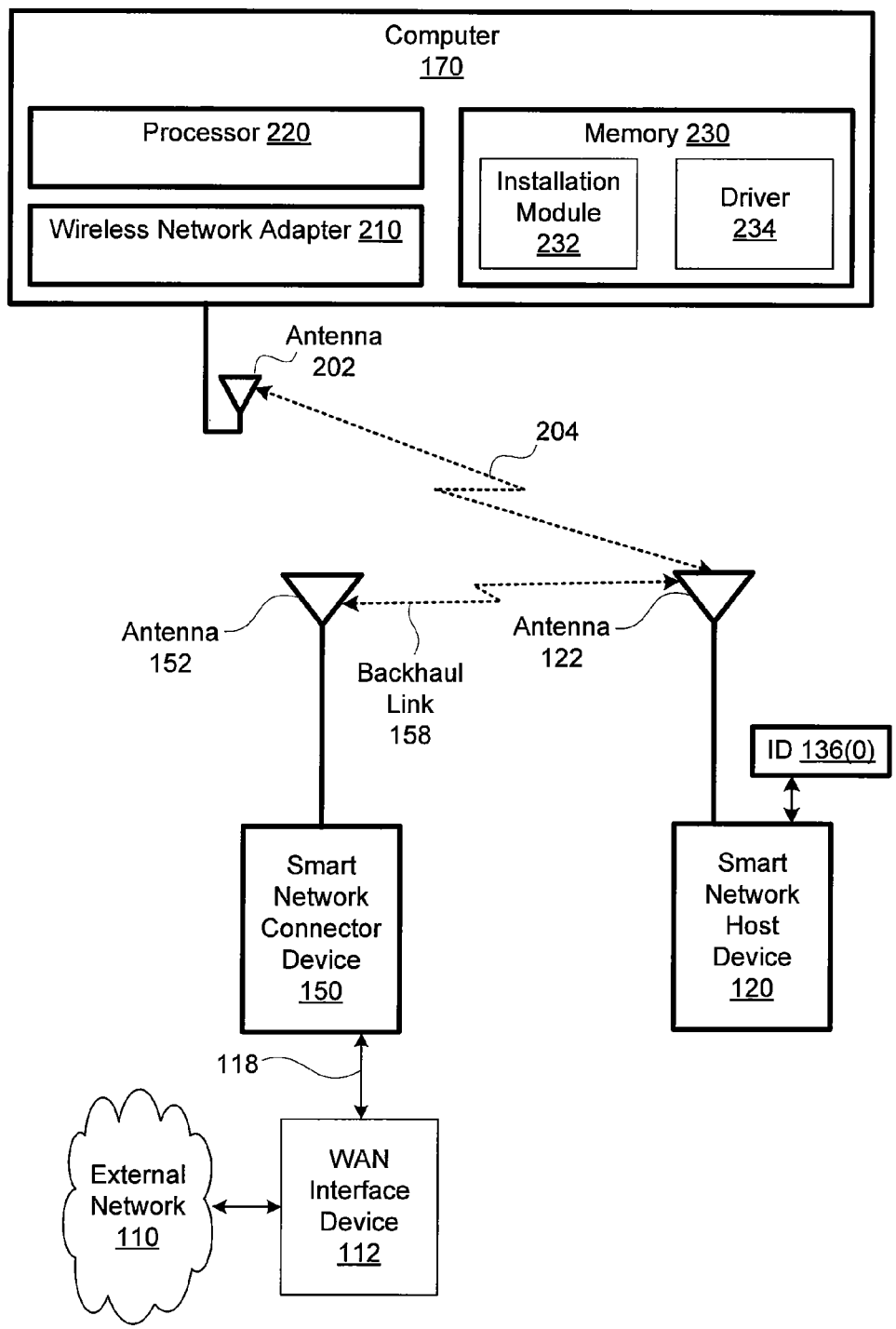
FIG. 2A illustrates a conceptual topology of multiple network devices that provide the basic infrastructure for a smart network, according to one example embodiment of the present invention.

FIG. 2A illustrates a conceptual topology of multiple network devices that provide the basic infrastructure for a smart network 102, according to one example embodiment of the present invention. A user may purchase a combination of a smart network host device 120 and a smart network connector device 150 to provide one or more wireless access points associated with smart network 102 to enable client devices 130 to connect wirelessly to the smart network 102 as well as to provide a connection to external network 110, such as the Internet. Smart network 102 may also include a computer 170 that enables a user to setup the smart network 102.

Computer 170 includes a wireless network adapter 210, a processor 220, and a memory 230. The wireless network adapter 210 is configured to receive and transmit wireless signals via antenna 202. In one embodiment, the wireless network adapter 210 implements one or more well-known standard protocols, such as IEEE standard 802.11n, that enable the wireless network adapter 210 to transmit and receive radio frequency signals in the 2.4 GHz and 5 GHz frequency bands. In another embodiment, the wireless network adapter 210 may be replaced with a wired network adapter, such as an Ethernet NIC, a USB™ port, or any other technically feasible communications interface capable of communicating with the smart network host device 120. Processor 220 may be any type of processing unit well-known in the art such as a central processing unit (CPU) that may include on-chip memory (RAM), one or more high speed caches, one or more processing cores and other common components of a CPU. In some embodiments, processor 220 may include two or more CPUs connected via a high-speed bus. Memory 230 may be any type of volatile memory such as dynamic random access memory (DRAM) or synchronous dynamic random access memory (SDRAM) that is configured to store data and programs for execution on processor 220. In some embodiments, memory 230 may also include non-volatile memory such as a hard disk drive or a flash memory device.

As shown in FIG. 2A, memory 230 stores installation module 232 and driver 234. Driver 234 is configured to enable the operating system (not shown) running on computer 170 to transmit and receive data on the smart network 102 via the wireless network adapter 210. Driver 234 may implement an application programming interface (API) that enables the installation module 232 to transmit or receive data packets over data link 204 via antenna 202. Antenna 202 is similar to antennas 122 or 152, described above.

In order for a user to setup the smart network 102 shown in FIG. 2A, the user must first install the installation module 232 in the memory 230 of the computer 170. In one embodiment, the installation module will be provided with the smart network host device 120 on a computer-readable storage medium such as a CD or DVD. The user may place the CD or DVD containing the installation module 232 in a drive of the computer 170, which causes the computer 170 to automatically transfer the installation module 232 to the memory 230. In another embodiment, the installation module 232 may be downloaded from a server connected to the Internet via a prior configured connection such as a wired Ethernet connection between WAN interface device 112 and an Ethernet NIC of computer 170. Once the installation module 232 is transferred to memory 230, the installation module 232 may be executed in processor 220 to cause computer 170 to begin a setup flow for configuring the smart network 102.

In one embodiment, the installation module 232 is configured to detect whether the operating system running on computer 170 is compatible with the current version of the installation module 232. If the operating system is not compatible, then the setup flow will terminate. However, if the operating system is compatible, then the installation module 232 may check for current internet connectivity. In one embodiment, the installation module 232 may query the operating system to determine whether computer 170 is connected to the internet. In another embodiment, installation module 232 may check for internet connectivity in any technically-feasible manner such as by attempting to ping a well-known IP address. If the computer 170 is connected to the Internet, then installation module 232 may determine whether an updated version of the installation module 232 is available on a remote server. In one embodiment, installation module 232 may transmit a message to a manufacturer website hosted on the remote server connected to the Internet. The message may be an XML message that queries the remote server as to a version number associated with the most up-to-date version of the installation module 232. If the version number received from the remote server does not match a version number associated with installation module 232 stored in memory 230, then the installation module 232 may be configured to download a new version of the installation module 232 and replace installation module 232 in memory 230 with the new version of the installation module 232.

However, if either computer 170 is not connected to the Internet or the installation module 232 is the most up-to-date version of the installation module 232, then the installation module 232 may determine whether the installation module 232 is executing on processor 220 with elevated privileges. For example, an installation module 232 designed for the Windows™ operating system may require administrator privileges. If installation module 232 determines that the installation module 232 is not executing with elevated privileges, then the installation module 232 may cause a user interface to be displayed on a display associated with computer 170 that prompts for the user to enter credentials for elevated privileges. If the installation module 232 determines that the credentials are invalid, then the installation module 232 may retry prompting the user for new credentials. Otherwise, the installation module 232 may be configured to terminate the setup flow.

However, if installation module 232 determines that the installation module 232 is executing with elevated privileges, then the installation module 232 may cause a user interface to be displayed on the display device that prompts the user to plug in the smart network host device 120 and the smart network connector device 150. The user interface may also prompt the user to place an ID device 136(0) associated with the smart network connector device 150 in proximity to the smart network host device 120. The ID device 136(0) enables the smart network host device 120 to authenticate the smart network connector device 150 via the backhaul link 158. In order to setup the smart network 102, the user places the smart network host device 120 at a desired location in the home, such as near the center of the home, and plugs in the smart network host device 120. Similarly, the user places the smart network connector device 150 at a location proximate to the WAN interface device 112. The user then plugs in the smart network connector device 150 and connects the smart network connector device 150 to the WAN interface device 112.

Once the user has been prompted to plug in the network devices, the installation module 232 is configured to determine whether a wireless network adapter 210 is enabled in computer 170. If a wireless network adapter 210 is not enabled, then installation module 232 determines whether the user would like to install a wireless network adapter 210. If the user has a wireless network adapter 210 to install in computer 170 or if a wireless network adapter 210 is already installed but needs to be enabled, the installation module 232 executes a setup flow for the wireless network adapter 210. For example, the installation module 232 may prompt the user to install driver 234 associated with the wireless network adapter 210 or, after prompting the user to install driver 234, may also prompt the user to turn off the computer 170, install the wireless network adapter 210 in the chassis of the computer 170 and reboot computer 170 so the operating system automatically recognizes the wireless network adapter 210 and enables the wireless network adapter 210 via driver 234. However, if the user indicates that he does not want to install a wireless network adapter 210, installation module 232 determines whether a wired network adapter is enabled. If no wired network adapter (or other suitable communication interface) is enabled, then installation module 232 may cause an error message to be displayed on the display device that indicates that no network adapters are available to connect to the smart network host device 120 and the setup flow terminates.

If either a wireless network adapter 210 or a wired network adapter is enabled, then installation module 232 attempts to connect with the smart network host device 120. In one embodiment, the smart network host device 120 provides a wireless access point to any wireless enabled devices within range of antenna 122. The smart network host device 120 may broadcast a well-known service set identifier (SSID) associated with the wireless access point. The installation module 232 may be configured to attempt to connect to the wireless access point associated with the well-known SSID via the wireless network adapter 210. The installation module 232 may prompt the user to enter network credentials to authenticate the smart network host device 120 as a trusted network device. The network credentials may be provided via a USB™ key or may be manually input via a keyboard connected to computer 170. The installation module 232 may then attempt to authenticate the smart network host device 120 via a handshake mechanism that tests whether the network credentials match the network credentials associated with the smart network host device 120. If the smart network host device 120 is authenticated, then the installation module 232 is connected to the smart network host device 120.

In alternative embodiments, the computer 120 may connect to the smart network host device via a wired connection such as via an Ethernet cable or a USB cable. In such embodiments, the installation module 232 may skip any type of network authentication because the physical connection ensures that the smart network host device 120 is a trusted network device.

If the installation module 232 determines that the connection to the smart network host device 120 has failed, then installation module 232 may attempt to re-connect to the smart network host device 120. Alternatively, installation module 232 may cause an error message to be displayed on the display device associated with computer 170 that informs the user that the smart network host device 120 cannot be detected. However, if the installation module 232 determines that the connection to the smart network host device 120 has succeeded, then installation module 232 may determine whether the smart network host device 120 is connected to a smart network connector device 150. In one embodiment, the installation module 232 is configured to send a message to the smart network host device 120 that queries the smart network host device 120 as to whether a smart network connector device 150 is connected to the smart network host device 120. For example, the ID device 136(0) may enable the smart network host device 120 to automatically establish a connection with the smart network connector device 150 via the backhaul link 158. The smart network host device 120 tracks the network devices authenticated with the smart network host device 120 via the ID device 136(0) and may transmit a response message to the installation module 232 that indicates whether the smart network host device 120 is connected to a smart network connector device 150.

If the smart network host device 120 is not connected to a smart network connector device 150, then the installation module 232 causes the smart network host device 120 to be configured as a router device. Such a configuration assumes that the user has setup a smart network 102 where the smart network host device 120 is connected directly to the WAN interface device (or is not connected to an external network at all) and will provide certain functions such as NAT, firewall services, and the like. In such configurations, one of the ports of the smart network host device 120 may be configured as a WAN port while the remainder of the ports of the smart network host device 120 are configured as LAN ports. However, if the smart network host device 120 is connected to a smart network connector device 150, then the installation module 232 causes the smart network connector device 150 to be configured as a router device and also causes the smart network host device 120 to be configured as a bridge device. In such configurations, all of the ports of the smart network host device 120 are configured as LAN ports.

After causing the smart network host device 120 and, if connected, the smart network connector device 150 to configure as network devices with particular functionality, installation module 232 determines whether the smart network host device 120 is connected to a smart network extender device 140. As shown in FIG. 2A, the user has not purchased a smart network extender device 140 and, therefore, the installation module 232 proceeds to configure the router device to connect to the Internet. In the particular embodiment shown in FIG. 2A, installation module 232 configures the smart network connector device 150 as a router device. Thus, installation module 232 configures the smart network connector device 150 to connect to the Internet. For example, installation module 232 may cause the smart network connector device 150 to broadcast a DHCP message on a WAN port of the smart network connector device 150 that is wired via an Ethernet cable directly to the WAN interface device 112. A DHCP server on a remote network hosted by an internet service provider (ISP) associated with the WAN interface device 112 may receive the broadcast DHCP message and transmit a DHCP response message to the smart network connector device 150. If the smart network connector device 150 receives a DHCP response message, the smart network connector device 150 may populate one or more routing tables in a memory of the router device using one or more IP addresses included in the DHCP response message. Consequently, the remote network hosted by the ISP may provide the smart network 102 with access to the Internet.

However, if the smart network connector device 150 does not receive a DHCP response message, the installation module 232 may prompt a user to enter network credentials for connecting with the remote network via point-to-point protocol over Ethernet (PPPoE) messages. Once the user has entered network credentials, the installation module 232 causes the smart network connector device 150 to broadcast a PPPoE message on the WAN port. If the smart network connector device 150 receives a PPPoE response message, then the smart network connector device 150 may populate one or more routing tables using one or more IP addresses included in the PPPoE response message. However, if the smart network connector device 150 does not receive a PPPoE response message, then the WAN interface device 112 may not be connected to the Internet.

Once the installation module 232 has configured the router device, installation module 232 checks for internet connectivity, as described above. If installation module 232 detects that the router device has failed to connect to the Internet, installation module 232 may determine whether to attempt to re-configure the router device. In one embodiment, installation module 232 may transmit a signal to the WAN interface device 112 that causes the WAN interface device 112 to perform a power cycle (i.e., rebooting the WAN interface device 112). In another embodiment, installation module 232 may display a user interface on the display device that prompts the user to manually remove power to the WAN interface device 112 and then plug the WAN interface device 112 back into a power source. The installation module 232 may then try to re-configure the router device. However, if installation module 232 determines not to attempt to re-configure the router device, installation module 232 may cause an error message to be displayed that indicates that the smart network 102 cannot connect to the Internet and the setup flow is terminated.

If installation module 232 determines that the router device is connected to the Internet, then installation module 232 may cause a user interface to be displayed on the display device that prompts the user to create a username and password for portal 172 installed on the computer 170. The username and password ensure that only authorized users may download and install applets 174 for use with smart network 102. In one embodiment, the username and password may provide access to the applet store 116 connected to the external network 110.

Figure 2B:
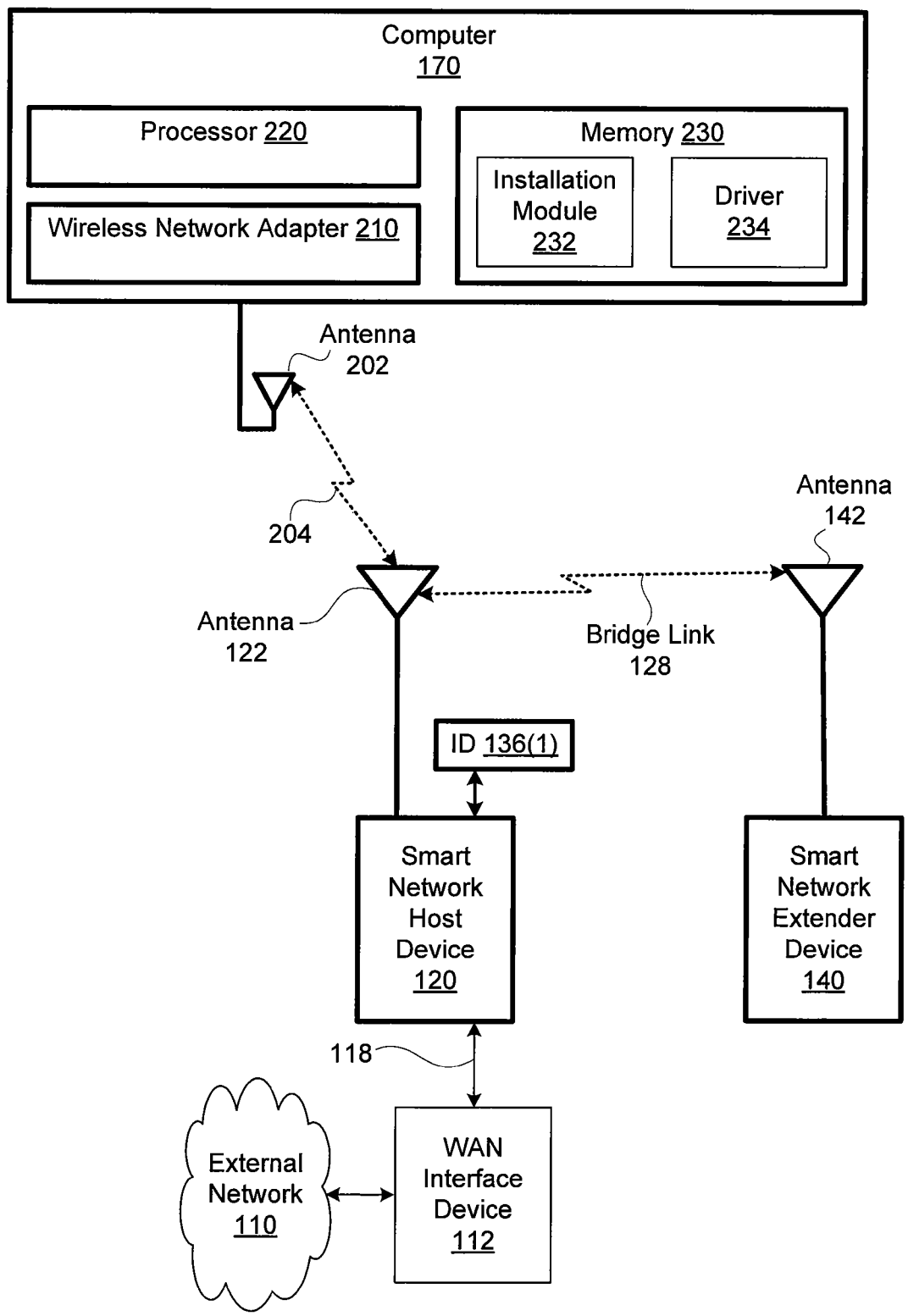
FIG. 2B illustrates a conceptual topology of multiple network devices that provide the basic infrastructure for a smart network, according to another example embodiment of the present invention.
Figure 3A:
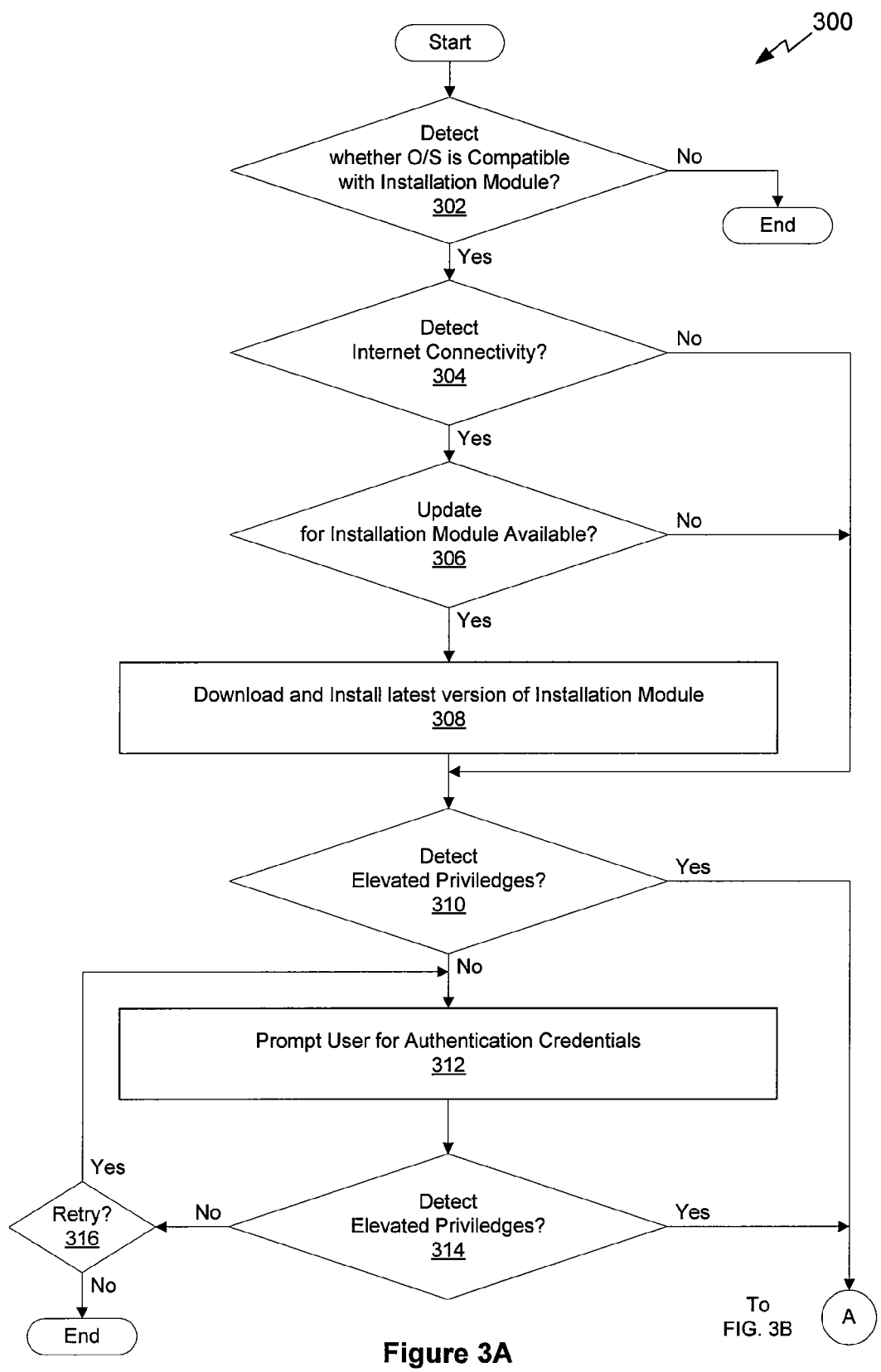
FIGS. 3A-3D are a flowchart of method steps for a setup flow to configure the smart network, according to one example embodiment of the present invention.
Figure 3B:
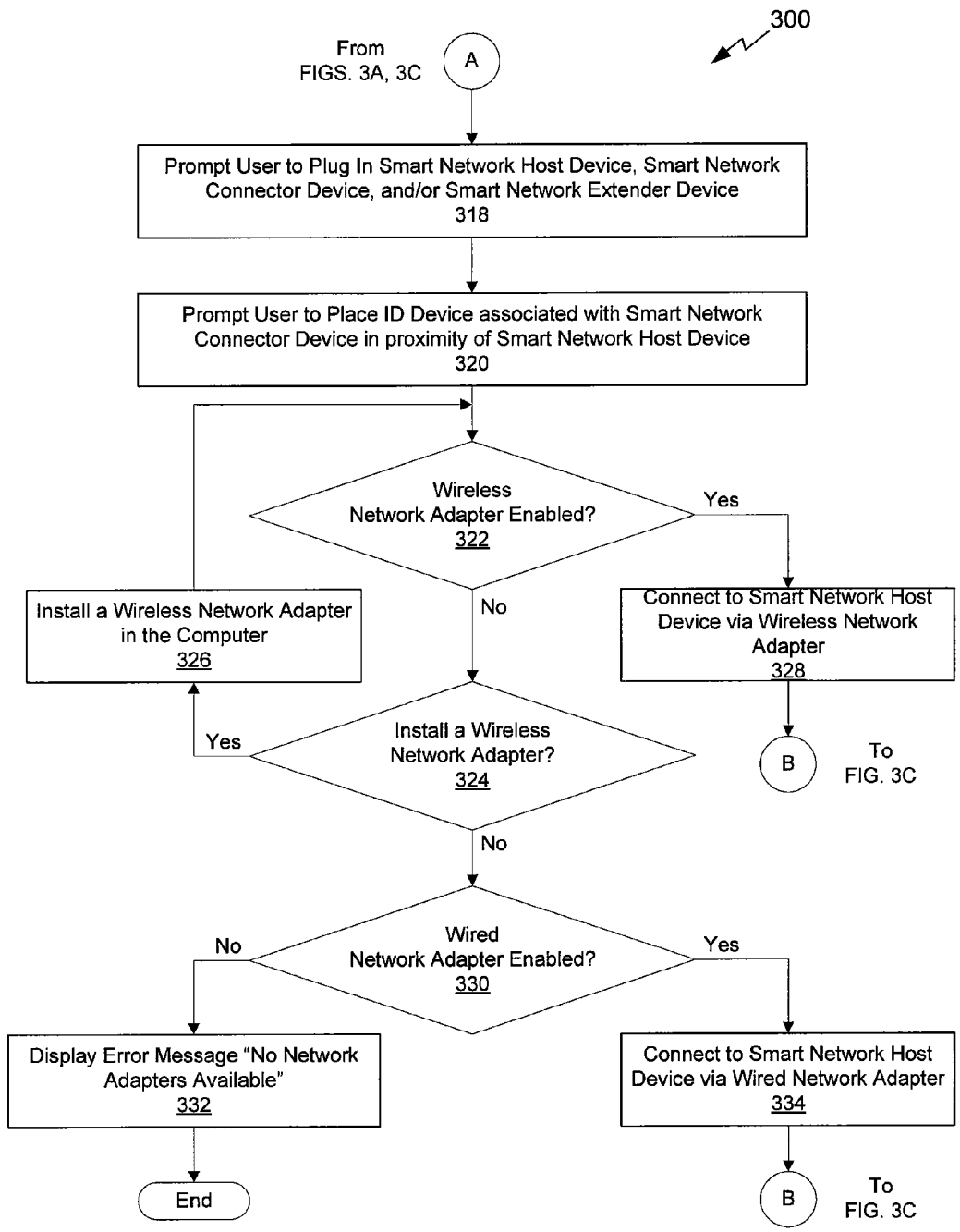
Figure 3C:
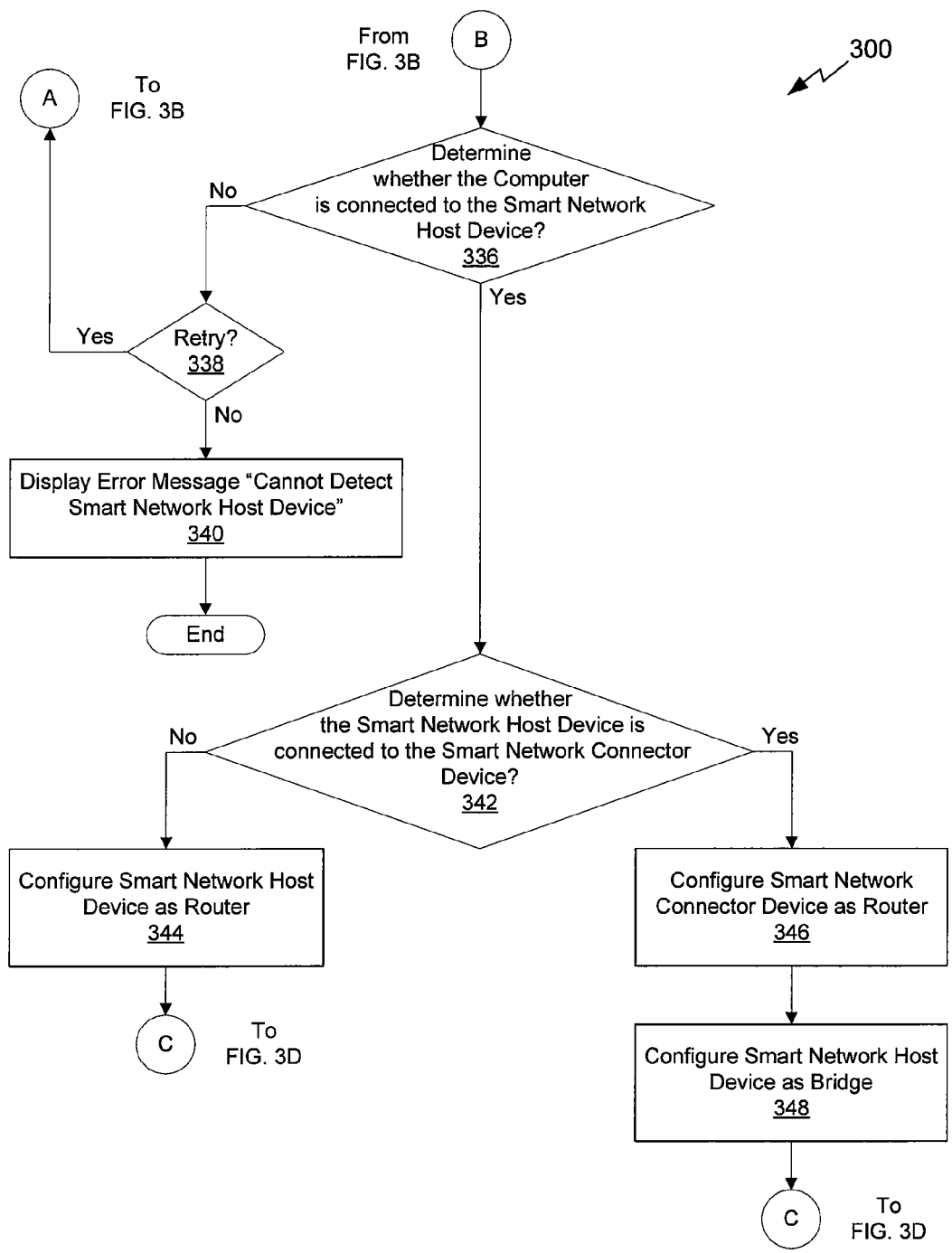
Figure 3D:
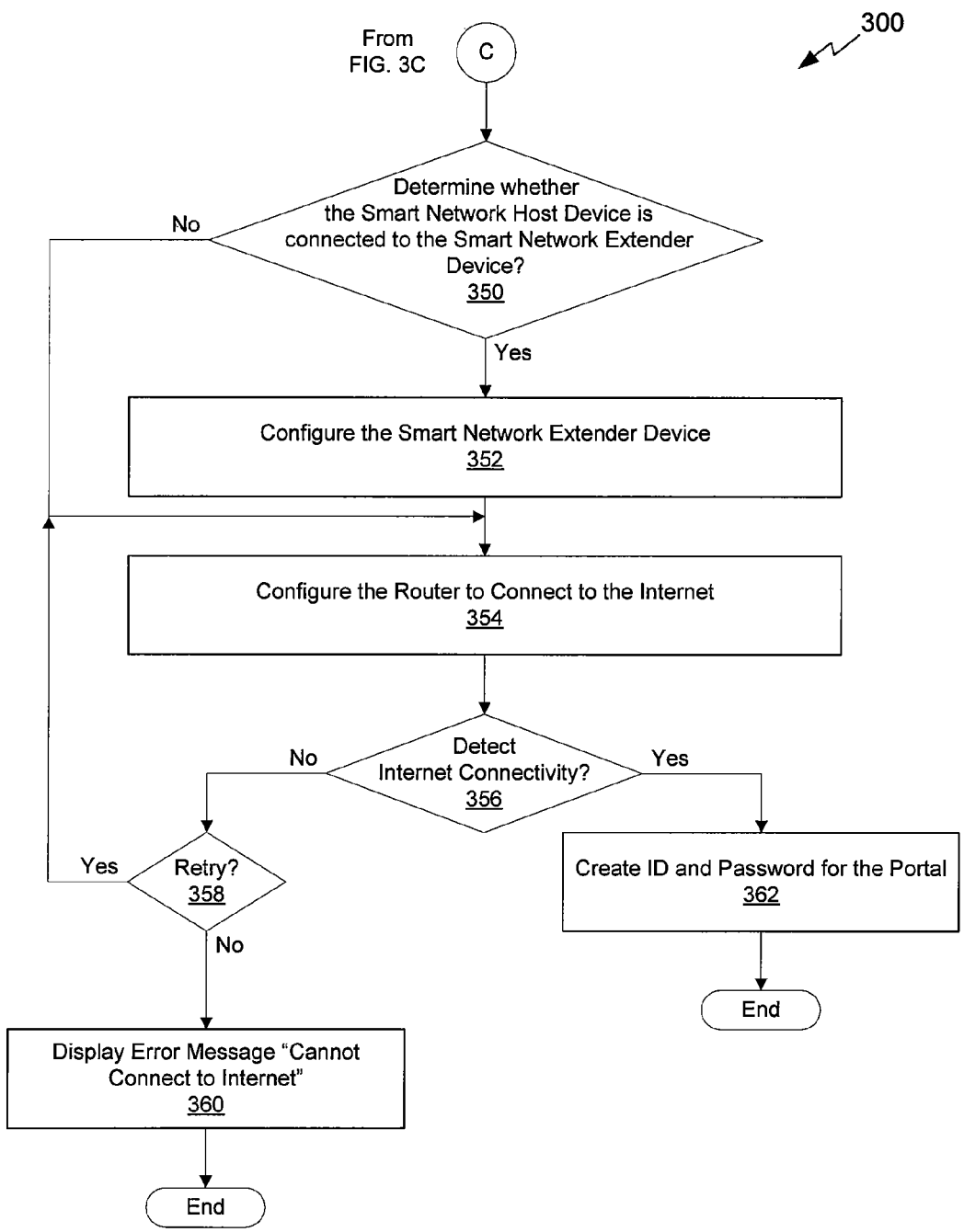

FIG. 2B illustrates a conceptual topology of multiple network devices that provide the basic infrastructure for a smart network 102, according to another example embodiment of the present invention. As shown in FIG. 2B, a user may purchase a combination of a smart network host device 120 and a smart network extender device 140 to provide one or more wireless access points associated with smart network 102 to enable client devices 130 to establish a wireless connection with the smart network 102 as well as a connection to external network 110, such as the Internet. In contrast to the smart network 102 of FIG. 2A, the smart network 102 of FIG. 2B is installed without a smart network connector device 150. Thus, installation module 232 causes the smart network host device 120 to be configured as a router device rather than a bridge device and the user must manually connect a cable from the WAN interface device 112 to a port on the smart network host device 120 that is configured as a WAN port in order to provide access to the external network 110.

In addition, installation module 232 may detect during the setup flow that the smart network host device 120 is connected to a smart network extender device 140 via the presence of ID device 136(1) that is associated with the smart network extender device 140. Thus, when the installation module 232 determines that the smart network extender device 140 is connected to the smart network host device 120 via bridge link 128, installation module 232 causes the smart network extender device to be configured to provide at least one additional wireless access point for client devices 130 to connect to the smart network 102.

It will be appreciated that initiating the setup flow via computer 170 is only one possible solution and that any device capable of implementing the functions of installation module 232 is contemplated to be within the scope of the present disclosure. For example, a manufacturer may provide a dedicated hardware device that implements installation module 232 in one or more hardware units. In another embodiment, installation module 232 may be included in the smart network host device 120. In such embodiments, installation module 232 may skip any steps involving establishing a connection between computer 170 and the smart network host device 120. Alternatively, the installation module 232 executing on the processor complex 160 of the smart network host device 120 may communicate with a thin client on a computer 170 to provide the user with a user interface. For example, a user may connect to a default IP address for the smart network host device 120 via a wired connection between a wired network adapter of computer 170 and a port of the smart network host device 120. The installation module 232 may be configured to transmit XML or HTML formatted documents to computer 170 that may be displayed in a web browser executing on computer 170.

FIGS. 3A-3D are a flowchart of method steps 300 for a setup flow to configure the smart network 102, according to one example embodiment of the present invention. Although the method steps are described in conjunction with the network system 100 of FIGS. 1A-1F and 2A-2B, persons skilled in the art will understand that any network system configured to perform the method steps, in any order, is within the scope of the invention.

As shown, the method 300 begins at step 302, where the installation module 232 is configured to detect whether the operating system running on computer 170 is compatible with the current version of the installation module 232. If the operating system is not compatible, then method 300 will terminate. However, if the operating system is compatible, then method 300 proceeds to step 304 where installation module 232 determines whether computer 170 is connected to the Internet. If computer 170 is connected to the Internet, then method 300 proceeds to step 306 where installation module 232 determines whether a new version of the installation module 232 is available from a remote server connected to the Internet. If a new version of the installation module 232 is available, then method 300 proceeds to step 308 where installation module 232 downloads and installs the new version of the installation module 232 on computer 170. Installation module 232 may then execute the new version of the installation module 232 and proceed to step 310.

Returning now to steps 304 and 306, if installation module 232 determines that computer 170 is not connected to the Internet or that a new version of the installation module 232 is not available on a remote server, then method 300 proceeds directly to step 310 where installation module 232 determines whether the installation module 232 is executing with elevated privileges. If installation module 232 determines that the installation module 232 is executing with elevated privileges, then method 300 proceeds to step 318. However, if installation module 232 determines that the installation module 232 is not executing with elevated privileges, then at step 312, installation module 232 prompts the user to enter authentication credentials to cause installation module 232 to be executed with elevated privileges. In one embodiment, elevated privileges provide installation module 232 with increased access to the hardware components of computer 170. At step 314, installation module 232 may again determine whether the installation module 232 is executing with elevated privileges after the user has entered the authentication credentials in step 312. If installation module 232 determines that the installation module 232 is still not executing with elevated privileges, then at step 316 installation module 232 determines whether to re-prompt the user for new authentication credentials. If installation module 232 determines to re-prompt the user for new authentication credentials, then method 300 returns to step 312 and the user is prompted a second time for new authentication credentials. However, if installation module 232 determines not to re-prompt the user for new authentication credentials, then method 300 terminates because the user does not have proper authority to install or configure the smart network 102. Returning now to step 314, if installation module 232 detects that the user has entered proper authentication credentials such that installation module 232 is executing with elevated privileges, then method 300 proceeds to step 318.

At step 318, the installation module 232 causes a user interface to be displayed on a display device associated with computer 170 that prompts the user to plug in the smart network host device 120, the smart network extender device 140, and/or the smart network connector device 150. At step 320, the installation module 232 may also prompt the user to place an ID device 136(0) associated with the smart network connector device 150 or an ID device 136(1) associated with the smart network extender device 140 in proximity to the smart network host device 120. As described above, the ID devices 136 enable the smart network host device 120 to automatically establish a connection with the smart network connector device 150 or the smart network extender device 140 via backhaul link 158 or bridge link 128, respectively.

At step 322, the installation module 232 determines whether a wireless network adapter 210 is enabled in computer 170. If a wireless network adapter 210 is enabled, then method 300 proceeds to step 328 where installation module 232 attempts to connect to the smart network host device 120 via the wireless network adapter 210. Returning now to step 322, if a wireless network adapter 210 is not enabled or a wireless network adapter 210 is not installed, then method 300 proceeds to step 324 where installation module 232 determines whether a user wants to install (or enable) a wireless network adapter 210. If the user wants to install a wireless network adapter 210, then, at step 326, installation module 232 runs a setup flow to install a wireless network adapter 210. For example, the setup flow for installing a wireless network adapter 210 may include the steps of prompting the user to turn off the computer and install the wireless network adapter 210 in an expansion slot of the computer 170 motherboard (not shown). Upon rebooting the computer 170, the installation module 232 may recognize the unknown hardware connected to the motherboard and install driver 234 to enable the computer 170 to access the wireless network adapter 210. Then, method 300 returns to step 322 to check whether the newly installed wireless network adapter 210 is enabled.

Returning now to step 324, if the user does not want to install a wireless network adapter 210, then method 300 proceeds to step 330 where installation module 232 determines whether a wired network adapter, such as an Ethernet NIC, is enabled in computer 170. If a wired network adapter is enabled, then method 300 proceeds to step 334 where installation module 232 attempts to connect to the smart network host device 120 via the wired network adapter. Returning to step 330, if a wired network adapter is not enabled or a wired network adapter is not installed, then method 300 proceeds to step 332 where installation module 232 causes an error message to be displayed that indicates that computer 170 does not have any network adapters available to connect to the smart network host device 120 and method 300 terminates.

At step 336, installation module 232 determines whether installation module 232 has successfully connected to the smart network host device 120. If installation module 232 is not connected to the smart network host device 120, then at step 338 the installation module 232 determines whether to attempt to re-connect to the smart network host device 120. If the installation module 232 determines to attempt to re-connect, then method 300 returns to step 318. However, if the installation module 232 determines not to attempt to re-connect, then method 300 proceeds to step 340 where an error message is displayed that indicates that the installation module 232 could not connect to the smart network host device 120. Returning to step 336, if installation module 232 is connected to the smart network host device 120, then method 300 proceeds to step 342.

At step 342, the installation module 232 determines whether the smart network host device 120 is connected to a smart network connector device 150. If the smart network host device 120 is not connected to the smart network connector device 150, then at step 344 the installation module 232 causes the smart network host device 120 to configure as a router device. However, if the smart network host device 120 is connected to the smart network connector device 150, then at step 346 the installation module 232 causes the smart network connector device 150 to configure as a router device and at step 348 the installation module 232 causes the smart network host device 120 to configure as a bridge device.

At step 350, the installation module 232 determines whether the smart network host device 120 is connected to a smart network extender device 140. If the smart network host device 120 is not connected to the smart network extender device 140, then method 300 proceeds to step 354 where the installation module 232 causes the router device (i.e., the smart network host device 120 or the smart network connector device 150, depending on the result of the determination in step 342) to attempt to connect to the internet. A process for causing the router device to attempt to connect to the Internet is described below in connection with FIG. 4. Returning to step 350, if the smart network host device 120 is connected to the smart network extender device 140, then at step 352 the installation module 232 causes the smart network extender device 140 to configure to provide at least one additional wireless access point for devices to connect to the smart network 102 and then method 300 proceeds to step 354, described above.

At step 356, the installation module 232 determines whether computer 170 is connected to the Internet. If computer 170 is not connected to the Internet, then method 300 proceeds to step 358 where installation module 232 determines whether to attempt to re-configure the router device to connect to the internet. If installation module 232 determines to attempt to re-configure the router device, then method 300 returns to step 354. However if installation module 232 determines not to attempt to re-configure the router device, then installation module 232 displays an error message that indicates that the smart network 102 cannot connect to the Internet and method 300 terminates.

Returning now to step 356, if computer 170 is connected to the Internet, then method 300 proceeds to step 362 where installation module 232 prompts the user to create a username and password for portal 172. In alternative embodiments, the username and password may provide a unique identifier for the user to access a user account in applet store 116. After step 362, the smart network 102 is at least partially configured and connected to the Internet, and method 300 terminates.

Figure 4:
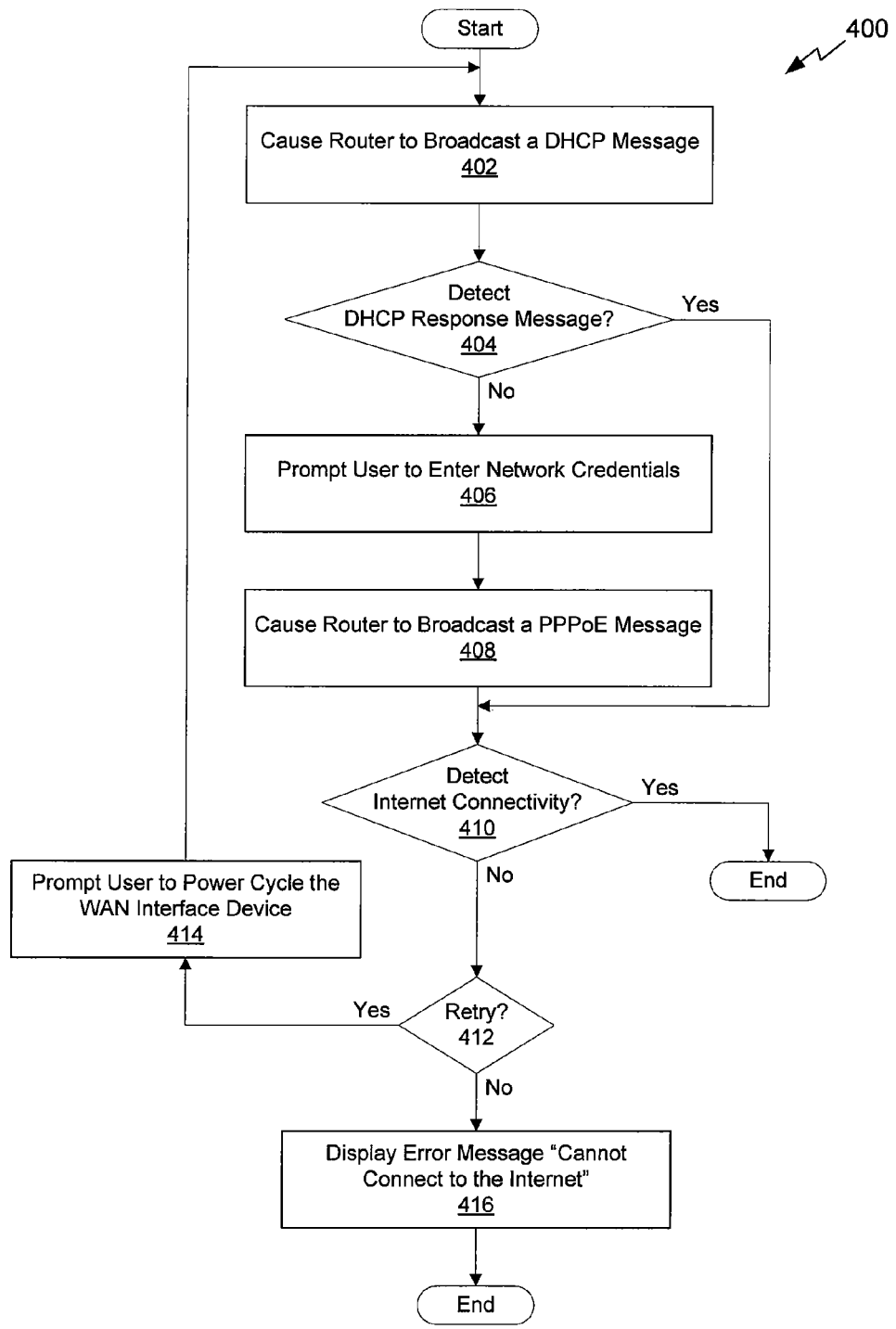
FIG. 4 is a flowchart of method steps for a setup flow for connecting a router device to the Internet, according to one example embodiment of the present invention.

FIG. 4 is a flowchart of method steps 400 for a setup flow for connecting a router device to the Internet, according to one example embodiment of the present invention. Although the method steps are described in conjunction with the network system 100 of FIGS. 1A-1F and 2A-2B, persons skilled in the art will understand that any network system configured to perform the method steps, in any order, is within the scope of the invention.

As shown, the method 400 begins at step 402, where installation module 232 may cause the router device (i.e., the smart network host device 120 or the smart network connector device 150, as the case may be) to broadcast a DHCP message on a WAN port of the router device that is wired directly to the WAN interface device 112. At step 404, the installation module 232 determines whether a DHCP response message was received by the router device. If a DHCP response message was received by the router device, then method 400 proceeds to step 410 where the installation module 232 determines whether computer 170 is connected to the Internet. Returning now to step 404, if a DHCP response message was not received by the router, then method 400 proceeds to step 406 where installation module 232 prompts the user to enter network credentials to connect to a remote server via PPPoE. At step 408, installation module 232 causes the router device to broadcast a PPPoE message that includes the network credentials received in step 406.

Returning now to step 410, installation module 232 determines whether the router device is connected to the Internet. If the router device is connected to the Internet, then the smart network 102 is successfully connected to the Internet and method 400 terminates. However, if the router device is not connected to the Internet, then method 400 proceeds to step 412 where installation module 232 determines whether to attempt to connect to the Internet again. If installation module 232 determines to attempt to connect to the Internet again, then method 400 proceeds to step 414 where installation module 232 prompts the user to power cycle the WAN interface device 112. In alternative embodiments, installation module 232 may be configured to send a signal to the WAN interface device 112 that causes the WAN interface device to reboot without user intervention. Once the WAN interface device 112 has completed a power cycle, method 400 returns to step 402 to attempt to establish a connection with the Internet. Returning now to step 412, if installation module 232 determines not to attempt to connect to the Internet again, then method 400 proceeds to step 416 where an error message is displayed that indicates that the router cannot connect to the Internet and method 400 terminates.

In sum, example embodiments of the invention provide systems and methods for configuring multiple network devices in a single setup flow. An installation module may be provided along with one or more network devices that is configured to establish communication with the various network devices and automatically configure the different network devices based on the number or type of network devices discovered by the installation module. The setup flow may automatically detect whether a host device is connected directly to a WAN interface or whether the host device is connected to the WAN interface via a backhaul link established between the host device and a connector device that is connected directly to the WAN interface. The setup flow causes the detected devices to be configured based on gathered topology information related to the wireless network.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the disclosure may be devised without departing from the basic scope thereof. Therefore, the scope of the present invention is determined by the claims that follow.

We claim:

1. A method, comprising:
    establishing a connection with a network host device that is configured to provide a wireless access point to one or more client devices for connecting to a wireless home network;
    upon determining that the network host device is connected to a network connector device that is configured to provide access to a wide area network (WAN), causing the network connector device to configure as a router device, and causing the network host device to configure as a bridge device, and
    upon determining that the network host device is not connected to the network connector device, causing the network host device to configure as a router device; and
    configuring either the network host device or the network connector device to connect to the WAN by:
        transmitting a Dynamic Host Configuration Protocol (DHCP) request; and
        upon determining that the DHCP request is not successful, transmitting a Point-to-Point Protocol over Ethernet (PPPoE) request, wherein the PPPoE request includes WAN network credentials entered by a user, wherein an error message is displayed that indicates that the wireless network cannot connect to the WAN upon determining that the PPPoE request is not successful.

2. The method of claim 1, wherein determining whether the network host device is connected to the network connector device comprises:
    transmitting a request message to the network host device that queries the network host device as to whether the network host device is connected to the network connector device; and
    receiving a response message from the network host device that indicates whether the network host device is or is not connected to the network connector device.

3. The method of claim 2, wherein the network host device is connected to the network connector device when a backhaul link that comprises a radio frequency communications channel has been established between the network host device and the network connector device.

4. The method of claim 3, wherein the backhaul link is established once the network host device retrieves authentication credentials from an ID (identification) device that is associated with the network connector device and has been physically placed in proximity to the network host device.

5. The method of claim 4, wherein the ID device comprises a radio frequency identification (RFID) device that stores unique information that identifies the network connector device as well as the authentication credentials associated with the network connector device.

6. The method of claim 1, further comprising determining that the network host device is connected to a network extender device that is configured to provide one or more additional wireless access points to one or more other client devices for connecting to the wireless network, causing the network extender device to configure as an access point device that provides at least one additional wireless access point for connecting to the wireless network.

7. The method of claim 1, wherein the wireless network is a wireless home network, the method:
    wherein transmitting the DHCP request comprises:
        causing either the network host device or the network connector device, as the case may be, to transmit the DHCP request message on a port that is configured as a WAN port;
        determining whether the network host device or the network connector device, as the case may be, receives a DHCP response message; and
        upon determining that either the network host device or the network connector device receives the DHCP response message, causing the WAN port to be associated with an IP address included in the DHCP response message;
        wherein the DHCP request is not successful upon determining that if neither the network host device nor the network connector device receives the DHCP response message;
    wherein transmitting the PPPoE request comprises:
        prompting the user to enter the WAN network credentials associated with the WAN,
        causing the network host device or the network connector device to transmit the PPPoE request message;
        determining whether the network host device or the network connector device, as the case may be, receives a PPPoE response message; and
        upon determining that either the network host device or the network connector device receives the PPPoE response message, causing the WAN port to be associated with an IP address included in the PPPoE response message, wherein the PPPoE request is not successful upon determining that neither the network host device nor the network connector device receives the PPPoE response message.

8. The method of claim 7, wherein the WAN is hosted by an internet service provider (ISP) that provides access to the Internet for the wireless home network.

9. A non-transitory computer-readable medium including instructions that, when executed by a processing unit, cause the processing unit to perform the steps of:

establishing a connection with a network host device that is configured to provide a wireless access point to one or more client devices for connecting to a wireless network;

upon determining that the network host device is connected to a network connector device that is configured to provide access to a wide area network (WAN), causing the network connector device to configure as a router device, and causing the network host device to configure as a bridge device, and upon determining that the network host device is not connected to the network connector device, causing the network host device to configure as a router device; and configuring either the network host device or the network connector device to connect to the WAN by:

transmitting a Dynamic Host Configuration Protocol (DHCP) request; and upon determining that the DHCP request is not successful, transmitting a Point-to-Point Protocol over Ethernet (PPPoE) request, wherein the PPPoE request includes WAN network credentials entered by a user, wherein an error message is displayed that indicates that the wireless network cannot connect to the WAN upon determining that the PPPoE request is not successful.

10. The non-transitory computer-readable medium of claim 9, wherein determining whether the network host device is connected to the network connector device comprises:

transmitting a request message to the network host device that queries the network host device as to whether the network host device is connected to the network connector device; and receiving a response message from the network host device that indicates whether the network host device is or is not connected to the network connector device.

11. The non-transitory computer-readable medium of claim 10, wherein the network host device is connected to the network connector device when a backhaul link that comprises a radio frequency communications channel has been established between the network host device and the network connector device.

12. The non-transitory computer-readable medium of claim 11, wherein the backhaul link is established once the network host device retrieves authentication credentials from an ID (identification) device that is associated with the network connector device and has been physically placed in proximity to the network host device.

13. The non-transitory computer-readable medium of claim 12, wherein the ID device comprises a radio frequency identification (RFID) device that stores unique information that identifies the network connector device as well as the authentication credentials associated with the network connector device.

14. The non-transitory computer-readable medium of claim 9, the steps further comprising determining that the network host device is connected to a network extender device that is configured to provide one or more additional wireless access points to one or more other client devices for connecting to the wireless network, causing the network extender device to configure as an access point device that provides at least one additional wireless access point for connecting to the wireless network.

15. The non-transitory computer-readable medium of claim 9, wherein the wireless network is a wireless home network, wherein transmitting the DHCP request comprises:

causing either the network host device or the network connector device, as the case may be, to transmit the DHCP request message on a port that is configured as a WAN port;

determining whether the network host device or the network connector device, as the case may be, receives a DHCP response message; and upon determining that either the network host device or the network connector device receives the DHCP response message, causing the WAN port to be associated with an IP address included in the DHCP response message;

wherein the DHCP request is not successful upon determining that neither the network host device nor the network connector device receives the DHCP response message;

wherein transmitting the PPPoE request comprises:

prompting the user to enter the WAN network credentials associated with the WAN, causing the network host device or the network connector device to transmit the PPPoE request message;

determining whether the network host device or the network connector device, as the case may be, receives a PPPoE response message; and upon determining that either the network host device or the network connector device receives the PPPoE response message, causing the WAN port to be associated with an IP address included in the PPPoE response message, wherein the PPPoE request is not successful upon determining that neither the network host device nor the network connector device receives the PPPoE response message.

16. The non-transitory computer-readable medium of claim 15, wherein the WAN is hosted by an internet service provider (ISP) that provides access to the Internet for the wireless home network.

17. A system, comprising:

a network host device that is configured to provide a wireless access point to one or more client devices for connecting to a wireless network; and an installation module that is configured to:

establish a connection with a network host device that is configured to provide a wireless access point to one or more client devices for connecting to a wireless network;

upon determining that the network host device is connected to a network connector device that is configured to provide access to a wide area network (WAN), causing the network connector device to configure as a router device, and causing the network host device to configure as a bridge device, and upon determining that the network host device is not connected to the network connector device, cause the network host device to configure as a router device; and configure either the network host device or the network connector device to connect to the WAN by:
transmitting a Dynamic Host Configuration Protocol (DHCP) request; and
upon determining that the DHCP request is not successful, transmitting a Point-to-Point Protocol over Ethernet (PPPoE) request, wherein the PPPoE request includes WAN network credentials entered by a user, wherein an error message is displayed that indicates that the wireless network cannot connect to the WAN upon determining that the PPPoE request is not successful.

18. The system of claim 17, wherein determining whether the network host device is connected to the network connector device comprises:
transmitting a request message to the network host device that queries the network host device as to whether the network host device is connected to the network connector device; and
receiving a response message from the network host device that indicates whether the network host device is or is not connected to the network connector device.

19. The system of claim 17, wherein the installation module is further configured to determine that the network host device is connected to a network extender device that is configured to provide one or more additional wireless access points to one or more other client devices for connecting to the wireless network, and cause the network extender device to configure as an access point device that provides at least one additional wireless access point for connecting to the wireless network.

20. The system of claim 17, wherein the wireless network is a wireless home network, wherein transmitting the DHCP request comprises:
causing either the network host device or the network connector device, as the case may be, to transmit the DHCP request message on a port that is configured as a WAN port;
determining whether the network host device or the network connector device, as the case may be, receives a DHCP response message; and
upon determining that either the network host device or the network connector device receives the DHCP response message, causing the WAN port to be associated with an IP address included in the DHCP response message;
wherein the DHCP request is not successful upon determining that if neither the network host device nor the network connector device receives the DHCP response message;

wherein transmitting the PPPoE request comprises:
prompting the user to enter the WAN network credentials associated with the WAN,
causing the network host device or the network connector device to transmit the PPPoE request message;
determining whether the network host device or the network connector device, as the case may be, receives a PPPoE response message; and
upon determining that either the network host device or the network connector device receives the PPPoE response message, causing the WAN port to be associated with an IP address included in the PPPoE response message,
wherein the PPPoE request is not successful upon determining that neither the network host device nor the network connector device receives the PPPoE response message.

* * * * *